A. T. CROSS.

Stylographic Fountain Pen.

No. 9,716 Reissued May 24, 1881.

*Witnesses.*

Homer L. Lindsley

Joseph J. Scholfield

*Inventor:*

Alonzo T. Cross

UNITED STATES PATENT OFFICE.

ALONZO T. CROSS, OF PROVIDENCE, RHODE ISLAND.

STYLOGRAPHIC FOUNTAIN-PEN.

SPECIFICATION forming part of Reissued Letters Patent No. 9,716, dated May 24, 1881.

Original No. 191,798, dated June 12, 1877. Application for reissue filed February 19, 1879.

*To all whom it may concern:*

Be it known that I, ALONZO T. CROSS, of Providence, in the State of Rhode Island, have invented an Improvement in Stylographic Fountain-Pens, of which the following is a specification.

My invention relates to an improvement in that class of fountain-pens where a tube of small caliber and a spindle made capable of an endwise movement within said tube by the act of writing is used in lieu of the ordinary writing-pen; and it consists in combining with the spindle an independently-moving adjustable carrier, whereby the amount of upward movement of said spindle may be regulated; and it also consists in making the spindle adjustable, in order that the resulting increased wear of the spindle may be compensated.

It also consists in a loosely-attached spindle, whereby the said spindle may be more readily kept in the line of the bore of the tube.

Figure 1:
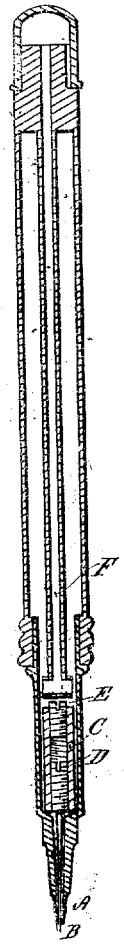
Figure 2:
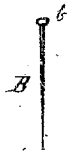
Figure 3:
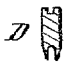
Figure 4:
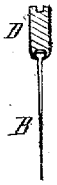

Figure 1 is a sectional view of a fountain-pen furnished with my improvement. Figs. 2, 3, and 4 are views showing the method of constructing and attaching the spindle.

In the drawings, A is the ink-delivery tube, and B the spindle, adjustably secured to the carrier or guide C. The upward movement of the spindle is properly limited by means of the adjusting-screw E, made to strike against the lower end of the air-tube F, in order that the lower end of the spindle at its highest limit of movement may not pass back within the aperture of the tube A. The spindle B is loosely attached to the screw D, which, operating within the female screw of the carrier, valve, or guide C, serves to adjust the spindle in order to compensate for wear, and to preserve the proper working relation with the aperture of the tube A, as above described. The carrier, valve, or guide C, at its lower limit of movement, rests upon the shoulders formed at the lower end of the ink-chamber, thus serving to properly limit the downward movement of the end of the spindle. The protrusion or retraction of the screw E within the carrier, valve, or guide C serves to diminish or increase the extent of the movement of the spindle, as desired, and the protrusion or retraction of the screw D, to the lower end of which the spindle B is secured, serves to properly locate the up-and-down movement of the end of the spindle with relation to the position of the end of the tube A.

In attaching the spindle B to the screw D, I first make a head, *b*, upon the spindle, as shown in Fig. 2, and then drill out and taper the screw, as shown in Fig. 3. I then insert the headed end of the spindle into the hole drilled in the screw, and mill the tapering end of the screw down around the head of the spindle, so as to form a loose joint, as shown in Fig. 4.

The objects of the above-described improvements are, first, to positively stop the upward movement of the spindle whenever its lower end has reached a point slightly in advance of the end of the tube, and to make the spindle adjustable, in order that it may in all cases be made to project from the lower aperture of the tube A to the exact extent desired, thus rendering it practicable to compensate exactly for the increased wear of the end of the spindle, resulting from the above-described positive limitation of its upward point of movement in advance of the end of the tube A, the deleterious wear of which will be prevented by the specified positively-held end of the spindle B; second, to make the spindle free to rise and fall within the bore of the ink-delivery tube without binding or cramping in case the spindle gets slightly bent by accident, which, in case of a rigid connection, as heretofore, would tend to render the pen inoperative. If the end of the spindle is allowed to pass within the end of the tube, the sharp edge of the aperture of the tube will scrape the loose fibers from the surface of the paper, and thus tend to clog the aperture and obstruct the flow of ink; but when the point of the spindle is properly held at its upper limit of movement, so as to rest in the position specified, then the sharp edge of the aperture in the tube A will be prevented from angular contact with the paper and the consequent scraping action.

It is deemed essential to the perfect working of a fountain-pen of this class that the spindle B should partake of an endwise movement in order to properly remove the thickened ink from the end of the tube, and to preserve a free and unobstructed passage at all times; but heretofore such moving spindles have been checked and restrained by positive means on their downward movement only, and have upon their upward movement been allowed to pass up to and within the end of the tube, thus allowing the fibers of the paper to enter and gradually choke the aperture.

I claim as my invention—

1. In a fountain-pen, the combination of a tubular point, a spindle adapted thereto and connected to an independently-moving spindle-carrier, said spindle-carrier being adjustable in relation to a fixed part of the pen, whereby the movement of the spindle may be changed and the wear thereof be compensated, as set forth.

2. The combination of the spindle-carrier C, loosely-attached spindle B, and ink-delivery tube A, substantially as described.

3. The combination of the spindle-carrier C, adjusting-screw D, loosely-attached spindle B, and ink-delivery tube A, substantially as described.

4. The combination of the spindle-carrier C, spindle B, and adjusting-screw E, substantially as described.

5. The combination, in a fountain-pen, of a gravitating valve, the swivel-spindle, and writing-point, substantially as and for the purpose described.

6. The combination, in a fountain-pen, of the gravitating valve, adjusting-screw, swivel-spindle, and writing-point, substantially as described, and for the purpose set forth.

ALONZO T. CROSS.

Witnesses:
HOMER L. LINDSLEY,
JOSEPH J. SCHOLFIELD.